Patented Dec. 22, 1925.

1,567,020

UNITED STATES PATENT OFFICE.

MILTON F. BEECHER AND MACDONALD C. BOOZE, OF WORCESTER, MASSACHUSETTS, ASSIGNORS TO NORTON COMPANY, OF WORCESTER, MASSACHUSETTS, A CORPORATION OF MASSACHUSETTS.

METHOD OF MAKING ARTICLES OF CERAMIC BONDED GRANULAR MATERIAL.

No Drawing.  Application filed May 15, 1923. Serial No. 639,216.

*To all whom it may concern:*

Be it known that we, MILTON F. BEECHER and MACDONALD C. BOOZE, citizens of the United States of America, residing at Worcester, in the county of Worcester and State of Massachusetts, have invented certain new and useful Improvements in Methods of Making Articles of Ceramic Bonded Granular Material, of which the following is a full, clear, and exact specification.

Our invention relates to the ceramic art and more particularly to a method of making articles of ceramic bonded refractory or abrasive grains, or anti-slipping material for use as a safety tread.

In making such ceramic articles as a refractory brick, an abrasive block or a safety tile, an expensive and elaborate procedure has heretofore been the practice. In accordance therewith, one usually mixes suitable proportions of abrasive grain and various ceramic materials with a considerable amount of water to obtain the desired degree of plasticity or moldability for shaping the article, and this water must be subsequently removed in a slow drying operation before the clay bond may be vitrified. If the article is to be made by the dry press method, so called, about 5% of water is added to the bond and abrasive mixture. After the materials have been mixed thoroughly, the damp material is measured off into the press mold and the required shape is formed therein. The pressed article must then be set in a drying room to evaporate the water and handled many times before it is fired. If the article is to be formed by the puddling process, the mass must be more thoroughly wetted in order to give a proper plasticity, the amount of water, which may be 20% of the total volume, depending upon the type of bond employed. This very plastic mixture, after being thoroughly stirred for a considerable time in order to produce the desired uniformity of composition, is run into a mold and then set away in a drying room to get rid of the water. Both the pressed and the puddled articles are friable and have little cohesive strength, hence they must be handled with great care during the various operations subsequent to shaping and they must be carefully set in the kiln to avoid warpage, breakage, etc., otherwise the rejections by the inspectors will be high. It will accordingly be seen that such methods are not economical for the manufacture of articles which do not need to be made of exact dimensions, such as a rubbing brick or a grinding wheel which must be trued to correct shape after it has been fired, and particularly such substances as terrazzo chips which are ordinarily rubbed or ground to a flat tread surface after being embedded in a concrete floor.

It is accordingly an object of our invention to overcome such difficulties and simplify the procedure of making various articles of ceramic bonded grains, as compared with the methods heretofore practiced, by reducing the number of required operations, eliminating the services of many skilled artisans as well as manual laborers, minimizing the losses which ordinarily result from careless workmanship and generally in saving time and expense and thus making a rapid and economical production a feasible proposition.

With this and other objects in view, as will be apparent in the following disclosure, our invention resides in the combination of steps as set forth in the specification and covered by the claims appended hereto.

In accordance with our discovery, we have found that ceramic articles of the class described may be made by a simplified procedure, in which the use of water is eliminated, thus obviating the necessity of shaping and drying the article before it can be fired. This is accomplished by firing a dry mixture of the ingredients held in a suitable container, the ceramic bond selected for this article having such properties that during vitrification it is capable of drawing the grains together and holding them in a unitary formation.

As a specific application of our invention, the following procedure involved in making a brick and terrazzo chips may be adopted. Abrasive and refractory grains are selected in accordance with the properties desired in the finished substance. For safety terrazzo chips we preferably utilize a super-refractory abrasive material of the type of crystalline alumina, which may be either in the natural form of corundum or emery, or as artificially prepared in the electric furnace, and with various degrees and types of impurities. Other equivalent materials, such as silicon carbide, may of course be employed as is well known by those skilled in the ceramic art, by making suitable changes in the bond composition and firing treatment.

Under the practice heretofore followed, the article has first been formed either by pressure or by puddling, which has resulted in a compact and reasonably dense structure. In order therefore that a dry mixture may be fired without a preliminary compacting operation and produce a strong article, we preferably utilize a bond mixture which is capable of being completely fused during the firing operation, since this fluid glass will through surface tension draw the grains of abrasive together and make a dense formation. It of course is obvious that various vitrifiable bonds which are not completely fused during the firing operation may be employed, within limitations which will be obvious to one skilled in the art. For example, it is of considerable importance to have the material shrink away from the sagger, so that it may be easily removed without injury to the comparatively expensive container. Hence we preferably select a bond which, if not entirely fused, yet has a sufficiently high shrinkage to allow of using our method to advantage. A ceramic bond which will be vitreous or entirely fused by the usual ceramic kiln treatment may be made up of the following ingredients:

Slip clay—44 parts by weight.
Ball clay—12 parts by weight.
Feldspar—44 parts by weight.

If the finished article is to form an anti-slipping terrazzo chip or an abrasive block, we so proportion the bond and the grain that the latter will make up the major portion of the total mass. A specific example of one composition may be as follows:

Crystalline alumina grain (60 mesh)—77% by weight.
Ceramic bond of the above composition—23% by weight.

It will of course be obvious that different grain sizes may be employed and that the bond mixture will be varied accordingly as is well known in this art. The density and structure of the product are determined by the nature of the ingredients employed as well as their relative proportions.

These materials are mixed in the dry condition until the ceramic bond has been thoroughly incorporated with the grains, this being preferably accomplished by means of a tumbling barrel or other suitable mechanical mixing device. The mixture is then, without supplementary treatment, shovelled into a refractory sagger and is ready for firing to vitrify the bond. This sagger may be made of fire clay or of super-refractory materials as is desired. In order to prevent the vitrified mass from sticking to the sagger, we preferably place a layer of a super-refractory granular material on the bottom of the sagger, and for this purpose may employ crystalline alumina grains similar to those incorporated in the article but without bond mixed therewith, so that upon firing, while a layer of these grains may become incorporated in the article, yet due to the absence of bond, they will not be united to the sagger.

The article is fired to vitrify the bond in accordance with well known ceramic procedure such as, for example, in a periodic or a tunnel kiln for a suitable period which may be 50 to 100 hours and at a temperature approximating cone 12 or about 1300° C., depending of course on the nature of the bond. For certain products, such as terrazzo chips, the firing operation may be very rapid and the cooling period may be materially shortened, since imperfections such as cracks formed in the article will not be detrimental and in fact may aid the subsequent operation of crushing the mass. In the firing operation the vitrifiable materials are fused to a glassy condition and thoroughly envelop the grains of abrasive and form posts and webs between the grains which bond them together, but owing to the small amount of bond ordinarily employed a considerable amount of pore space is left in the article.

By levelling the material in the sagger and taking suitable precautions well known to ceramists, it is possible to form an article which, while rough in appearance, will have more or less true dimensions and may be used as a brick or tile. The sagger may of course be specially shaped to give a desired form to the article. In order to form a terrazzo chip it is merely necessary that this fired article after cooling be crushed by suitable means such as a jaw crusher of the usual type. The chips are screened or sorted to the required dimensions and are then ready to be embedded in cement to form a terrazzo anti-slipping surfacing.

Certain types of grinding wheel may be produced by this method. If it is desired to form the wheel with a central hole for the machine spindle, we have found it feasible to utilize a core of combustible material, such as a cardboard tube or a wooden plug, which will hold the loose material in place until the sagger has been set in the kiln and danger of jarring is past. The nature of the core will depend on the capability of the loose material to hold its form during handling and the vitrification process.

It is obvious that various modifications may be made in our method and that numerous types of articles may be manufactured within the scope of our invention, hence the appended claims are to be interpreted broadly to cover such equivalent steps and products.

Having thus described our invention, what we claim as new and desire to secure by Letters Patent is:

1. The method of making a ceramic article comprising the steps of mixing abrasive grains and a vitrifiable bond in dry condition and thereafter firing the unformed dry mixture to vitrify the bond.

2. The method of making a ceramic article comprising the steps of dry mixing abrasive grains and a vitrifiable bonding material, placing the loose dry mixture in a refractory container and firing the same to vitrify the bond and form a unitary mass.

3. The method of making a ceramic article comprising the steps of dry mixing abrasive grains and a vitrifiable bond, supporting the loose dry mixture on a layer of super-refractory granules and firing the mass to vitrify the bond and unite the grains into an integral mass.

4. The method of making a hollow ceramic article comprising the steps of dry mixing abrasive grain and a vitrifiable bond, placing the loose, dry mixture around a combustible core in a refractory sagger, and thereafter firing the mixture to vitrify the bond and burn out the core.

5. The method of making a hollow ceramic article comprising the steps of dry mixing abrasive grains and a vitrifiable ceramic bond, placing a layer of super-refractory granules in the bottom of a container, packing the loose dry mixture around a combustible core within said container, and thereafter firing the mixture.

6. The method of making ceramic bodies comprising the steps of dry mixing abrasive grain and a ceramic bonding material capable of being fused to a vitreous condition, placing a layer of super-refractory granules on the bottom of a refractory sagger, packing the loose dry mixture in said sagger and firing the mixture to fuse the bond to a vitreous condition and form an integral mass.

In testimony whereof we have hereunto set our signatures.

MILTON F. BEECHER.
MACDONALD C. BOOZE.